3,391,069
RADICAL ANIONS OF ORGANIC COMPOUNDS
Michael McKay Rauhut, Norwalk, and George Warren Kennerly, Darien, Conn., assignors to American Cyanamid Company, Stamford, Conn., a corporation of Maine
No Drawing. Filed July 13, 1964, Ser. No. 382,370
20 Claims. (Cl. 204—59)

The present invention relates to chemiluminescence. It has been found, pursuant to the instant discovery, that visible chemiluminescent emission may be generated by the oxidation of an organic anion radical. According to the present invention, an anion radical of a fluorescent organic compound or a dianion of a fluorescent organic compound capable of direct conversion to its corresponding organic fluorescent compound, by giving up at least one electron, is oxidized with a sufficiently energetic oxidant to convert said fluorescent compound to its singlet excited state and thus provide a visible chemiluminescent emission.

A typical embodiment of the instant invention involves the preparation of a solution of sodium 9,10-diphenylanthracene radical anion in tetrahydrofuran and adding thereto a solution of benzoyl peroxide in tetrahydrofuran (THF), the total solution mixture being maintained in an inert atmosphere, such as under an atmosphere of nitrogen. A bright blue light is emitted. In equation form the reaction is as follows:

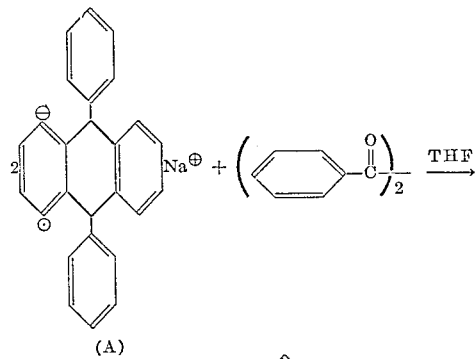

(A)

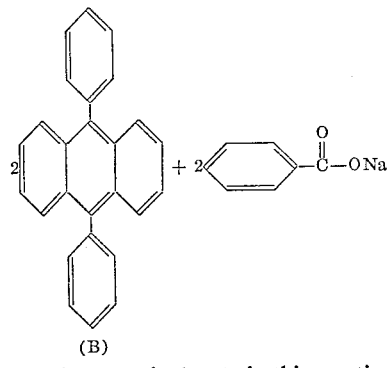

(B)

Formula B is produced in an excited state in this reaction and then decays to the ground state with emission of light.

Numerous organic anion radicals and dianions of the type described above are capable of direct conversion to their corresponding organic fluorescent compounds by giving up at least one electron. Typical of these are the anion radicals or dianions of fluorescent aromatic polycyclic hydrocarbons; and polycyclic heterocyclic fluorescent compounds capable of being converted to their corresponding anion radials or dianions, e.g., the corresponding aza analogs of the above fluorescent aromatic polycyclic hydrocarbons. Among these compounds are sodium 1,4-dimethoxyanthracenide, sodium 1 - methoxy - 9,10-diphenylanthracenide, potassium 1,4 - dimethoxy - 9,10-diphenylanthracenide, lithium 2,3 - benzofluoranthrenide, and other similar alkali metal, alkaline earth metal, and quaternary ammonium salts of anthracene, rubrene, pyrene, coronene, decacyclene, β-dinaphthylene oxide, 1,3-diphenylisobenzofuran, 1,7-phenanthroline, benzo-(1,2,3-g,h: 4,5,6-g',h')-diphenanthridine, N-methyl phenothiazine, and the like.

Typical oxidants within the purview of the instant invention and sufficiently energetic to provide an amount of energy at least equivalent to the amount of energy required to excite the aforementioned fluorescent compounds to their singlet excited state are chlorine, bromine, benzoyl peroxide, tertiary-butyl hypochlorite, and the like. As will be seen hereinafter, an electrolytic anode may be used as oxidant. The "energy of an excited state" is an easily measured experimental value. The energy difference between a first excited singlet and its corresponding ground state is defined by the frequency of the first absorption band in the ultraviolet or visible spectrum of the ground state species.

The physical energy released by a reaction is also an experimental quantity. The "free energy" of a reaction of the type given in the specific embodiment described above can be determined with considerable accuracy by polarographic measurements or by other procedures well known to the physical chemist.

Thus, the operable limits of anion radical chemiluminescence are capable of independent measurement and of clear definition in terms of physical characteristics of ion radicals, oxidants, and fluorescent products. Consequently, generating chemiluminescent emission by oxidizing an anion radical of the type contemplated herein with an oxidant sufficiently energetic to provide an amount of energy required to produce the resulting organic fluorescent compound corresponding to the organic anion radical in its singlet excited state can be accomplished by first recognizing the physical characteristics of the organic anion radical, as well as the physical characteristics of the oxidant to be used. If the oxidant is sufficiently energetic and the total amount of energy (say, in kilocalories) resulting from the reaction with the anion radical is enough to produce the corresponding organic fluorescent compound in its singlet excited state (defined above), visible light is produced.

The art has known that an anion radical can be oxidized to its corresponding hydrocarbon, e.g.,

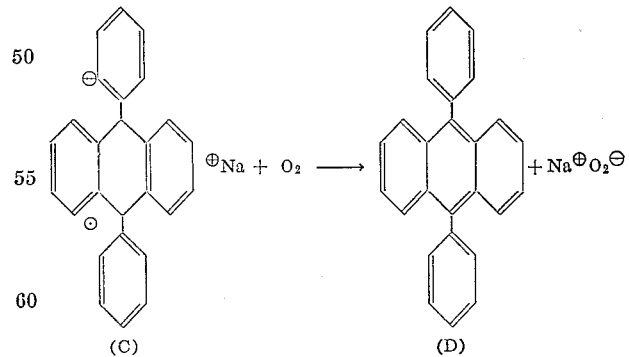

(C) (D)

but this oxidation is not chemiluminescent because the oxidant is not sufficiently energetic to excite the resulting organic fluorescent compound (D) to its singlet excited state, as defined above, i.e., the total amount of energy resulting from the reaction is inadequate. A review of anion radical chemistry is found in: V. L. Hansley, Industrial and Engineering Chemistry 43, 1759 (1951).

The temperature at which the organic anion radical is oxidized is not critical, since very excellent results have been achieved at ambient temperatures. Preferably, also, the process of the present invention is carried out in an inert atmosphere, e.g., nitrogen, helium, or the like.

Obviously, the present invention has numerous applications. For example, chemiluminescence of the type realized herein may be used in safety equipment for recognition lighting, signaling, etc.

The present invention will best be understood by virtue of the following illustrative examples:

Example I.—Chemiluminescence from reaction of sodium 9,10 diphenylanthracenide with chlorine A solution of 3.5 grams (0.01 mole) of sodium 9,10-diphenylanthracenide in 50 milliliters of anhydrous tetrahydrofuran contained in a glass-stopped 125 milliliter Erlenmeyer flask under nitrogen is briefly exposed to chlorine gas at the liquid surface. A brief, bright blue chemiluminescence is observed and the color of the purple anthracenide is discharged.

Example II.—Chemiluminescence from reaction of sodium 9,10-diphenylanthracenide with benzoyl peroxide To a solution of sodium 9,10 - diphenylanthracenide prepared by combining 0.33 gram (1 millimole) of 9,10-diphenyl anthracene in 10 milliliters of anhydrous tetrahydrofuran with 1 millimole of 1 molar sodium naphthalenide in tetrahydrofuran under nitrogen is rapidly added 0.29 gram (1 millimole) of benzoyl peroxide. A brief bright blue chemiluminescence is observed and the purple color of the anthracenide immediately changes to yellow.

Example III.—Chemiluminescence from oxidation of 9,10-diphenylanthracene radical anion at a mercury electrode A $2 \times 10^{-3}$ molar solution of tetrabutyl ammonium 9,10 - diphenylanthracenide in 1,2 - dimethoxyethane containing 0.1 molar tetrabutylammonium perchlorate is placed in an electrolytic cell. A direct current of about 0.5 milliamperes is passed through the cell at an applied potential of about 2 volts. A blue chemiluminescence appears at the anode of the cell concurrent with the oxidation of the radical anion to 9,10 - diphenylanthracene.

The following examples further illustrate the present invention, all of which are carried out at ambient temperature in the presence of an inert organic solvent, essentially as in Example I, supra:

The reactions in the above table produce a visible chemiluminescent emission. While only several solvents are employed, it should be borne in mind that any suitable inert organic solvent may be employed. Typical solvents are 1,2 - dimethoxyethane, tetrahydrofuran, dimethylformamide, dioxane, dimethylether of ethylene glycol, 2 - methylpyrrolidinone, tetramethyl urea, triethyl phosphate, and the like. Obviously, numerous other suitable inert organic solvents and mixtures of any of these will be apparent to the skilled chemist.

Clearly, the instant discovery encompasses numerous modifications within the skill of the art. Consequently, while the present invention has been described in detail with respect to specific embodiments thereof, it is not intended that these details be construed as limitations upon the scope of the invention, except insofar as they appear in the appended claims.

What is claimed is:

1. A method of generating a visible chemiluminescent emission which comprises oxidizing a reactant compound selected from the group consisting of an anion radical of a fluorescent organic compound and a dianion of a fluorescent organic compound, said reactant compound being capable of direct conversion to its corresponding fluorescent organic compound by giving up at least one electron, said oxidation being carried out with a sufficiently energetic oxidant to produce the resulting fluorescent organic compound in its singlet excited state and thus provide a visible chemiluminescent emission.

2. The method of claim 1 wherein the reactant compound is the anion radical of a fluorescent aromatic polycyclic hydrocarbon.

3. The method of claim 1 wherein the reactant compound is the dianion of a flourescent aromatic polycyclic hydrocarbon.

4. The method of claim 1 wherein the reactant compound is the anion radical of a fluorescent heterocyclic polycyclic compound.

5. The method of claim 1 wherein the reactant compound is the dianion of a fluorescent heterocyclic polycyclic compound.

6. The method of claim 1 wherein the reactant compound is sodium 9,10-diphenylanthracenide.

7. The method of claim 1 wherein the reactant compound is the disodium salt of rubrene.

8. The method of claim 1 wherein the reactant compound is the sodium salt of N-methyl phenothiazine.

9. The method of claim 1 wherein the reactant compound is the sodium salt of coronene.

| Example No. | Organic Anion Radical (a) | Oxidant (b) | Mole Ratio of (a):(b) | Solvent |
|---|---|---|---|---|
| IV | Sodium 9,10-diphenylanthracenide | Chlorine | 1:1 | THF. |
| V | do | Bromine | 10:1 | THF. |
| VI | do | Tertiarybutyl hypochlorite | 1:15 | THF. |
| VII | do | Oxalyl chloride | 1:1 | THF. |
| VIII | do | Benzoyl peroxide | 2:1 | THF. |
| IX | do | Potassium persulfate | 75:1 | THF. |
| X | Sodium 2,3-benzofluoranthrenide | Benzoyl peroxide | 1:2 | THF. |
| XI | Sodium salt of dinaphthalene oxide | do | 17:1 | THF. |
| XII | Sodium salt of 1,3-di-phenylisobenzofuran | $Cl_2$ | 1:80 | THF. |
| XIII | Sodium salt of 1,7-phenanthroline | Benzoyl peroxide | 1:2 | THF. |
| XIV | Sodium salt of 1,10-phenanthroline | do | 1:1 | THF. |
| XV | Sodium salt of benzo-(1,2,3-g,h:4,5,6,g′,h′)-diphenanthradine | do | 3:1 | THF. |
| XVI | Sodium salt of N-methyl phenothiazine | do | 1:95 | THF. |
| XVII | Sodium 9,10-diphenylanthracenide | $Cl_2$ | 1:2 | THF. |
| XVIII | do | Benzoyl peroxide | 1:1 | THF. |
| XIX | Disodium 9,10-diphenylanthracenide | do | 1:1 | THF. |
| XX | Tetrabutylammonium 9,10-diphenylanthracenide | Anodic | 3:1 | Glyme. |
| XXI | Sodium 1-methoxy-9,10-diphenylanthracenide | Benzoyl peroxide | 2:1 | THF. |
| XXII | Sodium 1,4-dimethoxy-9,10-diphenylanthracenide | do | 10:1 | THF. |
| XXIII | Sodium salt of rubrene | do | 1:5 | THF. |
| XXIV | Disodium salt of rubrene | do | 1:1 | THF. |
| XXV | Tetrabutylammonium rubrene | Anodic | 1:1 | Glyme. |
| XXVI | Sodium salt of pyrene | Benzoyl peroxide | 3:1 | THF. |
| XXVII | Sodium salt of coronene | do | 1:1 | THF. |
| XXVIII | Sodium salt of decacyclene | do | 1:3 | THF. |
| XXIX | Sodium 1,4-dimethoxyanthracenide | $Cl_2$ | 1:5 | THF. |

10. The method of claim 1 wherein the reactant compound is the sodium salt of decacyclene.

11. The method of claim 1 wherein the oxidizing agent is benzoyl peroxide.

12. The method of claim 1 wherein the oxidizing agent is chlorine.

13. The method of claim 1 wherein the oxidizing agent is bromine.

14. The method of claim 1 wherein the oxidizing agent is tertiary-butyl hypochorite.

15. The method of claim 1 wherein the oxidizing agent is potassium persulfate.

16. The method of claim 1 wherein the reactant compound is oxidized at the anode of an electrolytic cell through which electric current is passed.

17. The method of claim 2 wherein the reactant compound is oxidized at the anode of an electrolytic cell through which electric current is passed.

18. The method of claim 3 wherein the reactant compound is oxidized at the anode of an electrolytic cell through which electric current is passed.

19. The method of claim 4 wherein the reactant compound is oxidized at the anode of an electrolytic cell through which electric current is passed.

20. The method of claim 5 wherein the reactant compound is oxidized at the anode of an electrolytic cell through which electric current is passed.

References Cited

UNITED STATES PATENTS 2,420,286   5/1947   Lacey et al. -------- 252—188.3
3,264,221   8/1966   Winberg ----------- 252—188.3

OTHER REFERENCES

Dement, J. H. Fluorochemistry, Chemical Publishing Co., Inc., Brooklyn, N.Y., 1945, pp. 624 to 630.

Kallman et al., Charge Injection into Organic Crystals: Influence of Electrodes on Dark and Photoconductivity, J. Chem. Phys., vol. 36, No. 9, May 1962, pp. 2486–2492.

JOHN H. MACK, *Primary Examiner.*

H. M. FLOURNOY, *Assistant Examiner.*